Patented Dec. 4, 1951

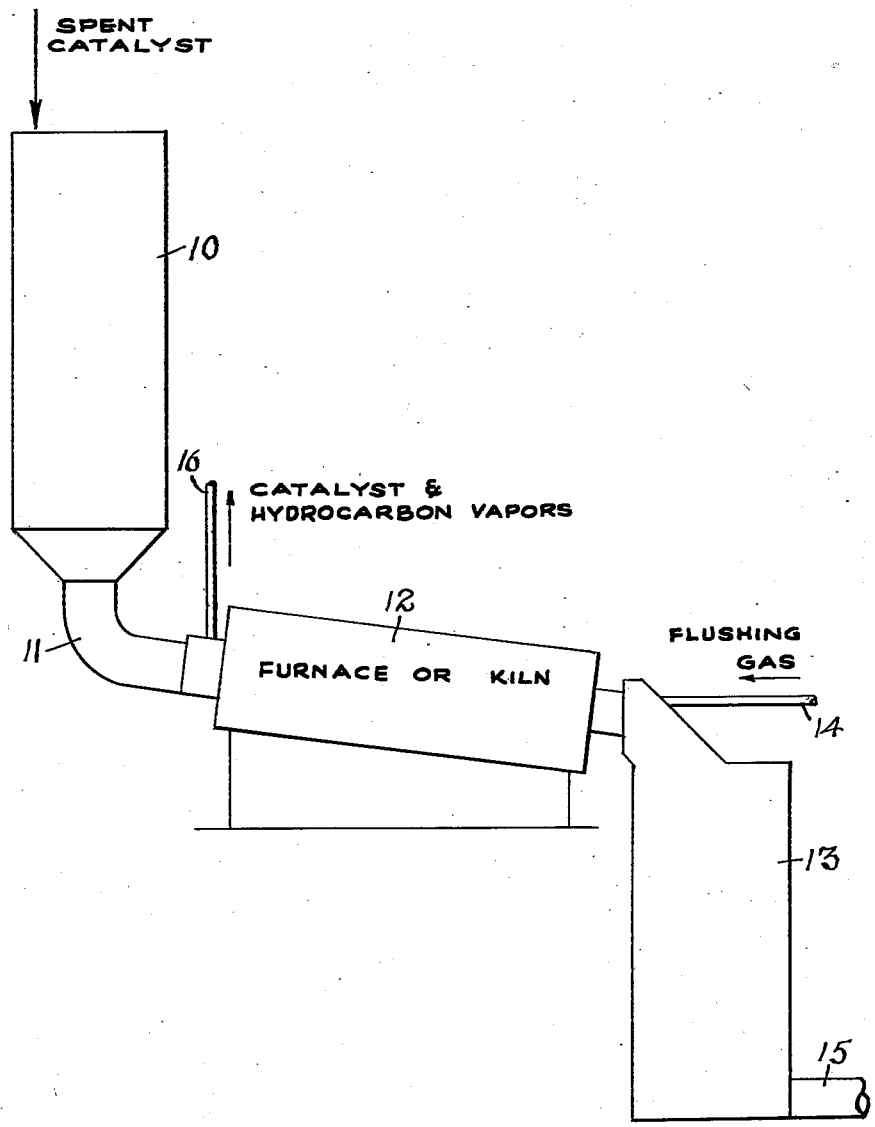

2,577,591

UNITED STATES PATENT OFFICE 2,577,591

PREPARATION OF A SUPPORTED ALUMINUM-HALIDE-CARBON CATALYST

Howard R. Sailors, Bartlesville, Okla., assignor to Phillips Petroleum Company, a corporation of Delaware Application December 10, 1947, Serial No. 790,877

15 Claims. (Cl. 252—442)

This invention relates to a novel catalyst support and a method of preparing it.

One of the objects of the invention is the preparation of a novel catalyst support from a spent catalyst comprising an aluminum halide-hydrocarbon complex such as an aluminum chloride-hydrocarbon complex or an aluminum bromide-hydrocarbon complex.

Another object of the invention is to provide a method of processing sludge-fouled aluminum halide catalyst mounted on an inorganic adsorptive carrier to recover the aluminum halide on the carrier.

Still another object of the invention is to provide such a process wherein the carrier recovered therefrom has improved characteristics when again used as a carrier, particularly for aluminum halide catalyst.

A still more specific object of the invention is to provide such a process by means of which the recovered carrier has improved characteristics in that it has carbon deposited thereon which carbon exhibits properties similar to activated carbon.

A still further object of this invention is to provide a novel catalyst in which such a recovered carrier is used as a support for aluminum halides such as aluminum chloride and aluminum bromide.

From another viewpoint it is an object of this invention to process an aluminum chloride or aluminum bromide hydrocarbon complex to recover the aluminum halide, the hydrocarbons and the carrier which comprise such a complex.

Other and more detailed objects of the invention will be apparent from the following description thereof.

This invention consists of the methods herein disclosed and the products thereof.

In the accompanying drawing, the single figure is a diagrammatic and schematic illustration of one form of apparatus by means of which the method herein disclosed may be practiced.

In various hydrocarbon catalytic processes such as isomerization, polymerization and alkylation, the catalyst employed is usually aluminum chloride or aluminum bromide supported on an inorganic adsorptive carrier such as bauxite, zeolite, keiselguhr, permutite, and other similar materials. It is also shown in United States Patent No. 2,278,934, to Lee that activated carbon when used as a support and surface extender for aluminum bromide results in a catalyst of improved activity which is a better catalyst for isomerization, for example, than is the case when other solid inorganic adsorptive carriers such as those mentioned above are used.

During the course of such processes as, for example, the isomerization of hydrocarbons using aluminum chloride, for example, on solid inorganic adsorptive carriers as the catalyst, a sludge is formed which in time renders the catalyst inactive. In this art, this sludge is commonly known as an aluminum chloride-hydrocarbon complex and, as far as is known, no successful method has been provided for the recovery of the aluminum chloride or the adsorptive support in a condition satisfactory for reuse.

A first object of this invention is to process such a complex so as to recover the aluminum halide such as aluminum chloride or aluminum bromide and the adsorptive support in a condition satisfactory for reuse.

A further object of the invention is to recover the adsorptive support in an improved condition for reuse as a catalyst support.

Finally, another object of the invention is the provision of a new catalyst for such processes using such a recovered support as a support.

In accordance with the method of this invention, the sludge fouled aluminum chloride or aluminum bromide and adsorptive support catalyst which is rendered inactive by the presence of an aluminum chloride or aluminum bromide-hydrocarbon complex which covers the active surface of the catalyst is processed as follows:

Such a spent catalyst, upon removal from the catalyst chamber, is heated in any suitable way to a temperature at which the complex decomposes, releasing aluminum chloride and the hydrocarbons forming therewith the complex as vapors from which the aluminum chloride and hydrocarbons may be individually recovered, if desired, by processes with which this invention is not concerned. In this heat treatment of the complex, carbon is deposited on the support, which as stated above, may be any one of the solid inorganic adsorptive carriers commonly used as supports for these processes such as bauxite, zeolite, kieselguhr, permutite, and the like. The carbon is deposited not only on the outer surface but also in the pores of the support and this carbon remains as activated carbon, shown above to be a suitable support for aluminum chloride and aluminum bromide in such processes. In accordance with this invention it is preferred to heat the complex at a temperature within the range of 400° F. to about 900° F. with the preferred range of about 550° F. to about 750° F.

It is observed from experiment that the precaution should be taken in heating the complex not to heat it too rapidly as this will lead to the generation of gas pressure within the granules which may disrupt them and form smaller particles than are desirable for the purpose. Therefore, the complex should be slowly brought up to temperature to avoid this result. Although the optimum rate of heating in any particular application is probably best determined by trial, it may be stated in general that the spent catalyst should be heated to about 500° F. in not less than about five minutes and preferably not less than about ten to fifteen minutes.

The recovered support, if it is to be used again as a catalyst support, is reactivated with aluminum chloride or aluminum bromide in many of the ways known in the art including liquid or vapor phase impregnation. It may then be recharged to the process as, for example, the isomerization reactor in the case of an isomerization process.

By using this method it is also possible to prepare an improved catalyst support from previously unused supporting material. For example, an inorganic adsorptive support such as bauxite may be impregnated with a fluid aluminum chloride-hydrocarbon complex and the resulting product heated as previously described to drive off most of the aluminum chloride along with the hydrocarbons therein, resulting in the impregnation of the support with a deposit of activated carbon having a residual aluminum chloride content. The vapors which are driven off may be separated as before to recover the aluminum chloride and individual hydrocarbons for further use. It has been found that a bauxite support is able to hold about 35% of its own weight of such a complex and after heating in accordance with the above procedure, with the resultant deposition of carbon thereon, the support has about 107% of weight with respect to the original bauxite.

It will of course be understood that in a similar way the other solid inorganic adsorptive carriers suitable for the purpose, of which several examples have been given above, can be similarly treated to activate them by the deposition of a carbon thereon that exhibits a chemical activity similar to activated carbon. The support thus prepared can then be used as a catalyst after aluminum chloride or aluminum bromide is deposited thereon by any of the well known methods in the art, including liquid or vapor phase impregnation.

While it is apparent that any equipment suitable for carrying out the heating process described above can be used, an illustrated embodiment of one form of suitable apparatus will be described in connection with the drawing.

There is illustrated at 10 a suitable hopper into which the spent catalyst consisting, for example, of bauxite impregnated with aluminum chloride-hydrocarbon complex is charged and from which it is conducted by means of the conduit 11 to a suitable furnace 12. This furnace is diagrammatically illustrated as a kiln of the rotary type heated by any suitable method. In the kiln 12 the spent catalyst is heated to the desired temperature at the proper rate to avoid the difficulty referred to above until the aluminum chloride-hydrocarbon complex on the bauxite decomposes with the deposition of carbon thereon. The aluminum chloride and hydrocarbon vapors resulting from the deposition of the complex are removed from the kiln through the line 16, which removal is aided by the introduction of a flushing gas, preferably substantially non-reactive, into the kiln through the line 14. The processed bauxite with its deposit of carbon thereon and some residual aluminum chloride is discharged from the kiln into the receiving container 13 from which it may be removed by the conduit 15 in any suitable manner for reuse.

It is clear that a wide variation in the details of this apparatus are possible since the method is capable of being practiced in various equivalent apparatus systems.

As the illustrative material herein is capable of considerable variation in details, I do not desire to be strictly limited thereto but only as required by the appended claims.

What is claimed is:

1. A method of processing an aluminum halide-hydrocarbon complex supported on a solid inorganic adsorptive carrier which comprises heating the complex to a temperature of from 400° F. to 900° F. to decompose it, vaporize the aluminum halide and hydrocarbons, and deposit carbon on said carrier.

2. In the method of claim 1, said carrier being bauxite.

3. In the method of claim 1, said aluminum halide being aluminum chloride.

4. In the method of claim 1, said aluminum halide being aluminum bromide.

5. In the method of claim 1, said carrier being bauxite and said halide being aluminum chloride.

6. A method of activating a catalyst carrier which comprises depositing an aluminum halide-hydrocarbon complex on a solid inorganic adsorptive carrier, heating said carrier to a temperature below 900° F. to vaporize the aluminum halide and hydrocarbons forming the complex and deposit carbon on the carrier, removing the vapors from contact with the carrier and depositing an aluminum halide on the resulting carrier.

7. In the method of claim 6, said halide being aluminum chloride.

8. In the method of claim 6, said halide being aluminum bromide.

9. In the method of claim 1, the additional step of heating the complex to a temperature of from 400 to 900° F. in not less than five minutes.

10. In the method of claim 6, the additional step of heating the carrier to a temperature below 900° F. in not less than five minutes.

11. A catalyst carrier consisting essentially of an inorganic adsorptive material having activated carbon deposited on the surface and within the pores thereof, said catalyst carrier being the product of a process comprising heating said carrier bearing a deposit of an aluminum halide-hydrocarbon complex to a temperature below about 900° F. to vaporize substantially all of the aluminum halide and the hydrocarbon forming the complex and to decompose some of said hydrocarbon complex to activated carbon and thereby leave activated carbon on the carrier with some residual aluminum halide.

12. A catalyst carrier in accordance with claim 11 wherein the inorganic adsorptive material is bauxite.

13. A catalyst consisting essentially of an aluminum halide-impregnated inorganic adsorptive material carrier having activated carbon deposited on the surface and within the pores thereof, said carrier being the product of a process comprising heating said carrier bearing a deposit of aluminum halide hydrocarbon complex to a temperature below about 900° F. to vaporize substantially all of the aluminum halide and the hydrocarbon forming the complex and to decompose some of said hydrocarbon complex to activated carbon and thereby leave activated carbon on the carrier with some residual aluminum halide.

14. A catalyst in accordance with claim 13 in which said halide is aluminum chloride.

15. The catalyst in accordance with claim 13 in which said halide is aluminum bromide.

HOWARD R. SAILORS.

REFERENCES CITED

The following references are of record in the file of this patent:

UNITED STATES PATENTS

| Number | Name | Date |
|---|---|---|
| 1,540,446 | Wilson | June 2, 1925 |
| 2,191,592 | Fitz Simons | Feb. 27, 1940 |
| 2,208,362 | Engel | July 16, 1940 |
| 2,293,891 | Evering et al. | Aug. 25, 1942 |
| 2,364,106 | Solomon et al. | Dec. 5, 1944 |
| 2,388,932 | Ogorzaly | Nov. 13, 1945 |
| 2,415,716 | Veltman | Feb. 11, 1947 |
| 2,417,359 | Guyer | Mar. 11, 1947 |
| 2,423,845 | Myers | July 15, 1947 |
| 2,428,923 | Thomas et al. | Oct. 14, 1947 |